(No Model.)
H. G. JOHNSON.
CORN PLANTER.
No. 362,161. Patented May 3, 1887.
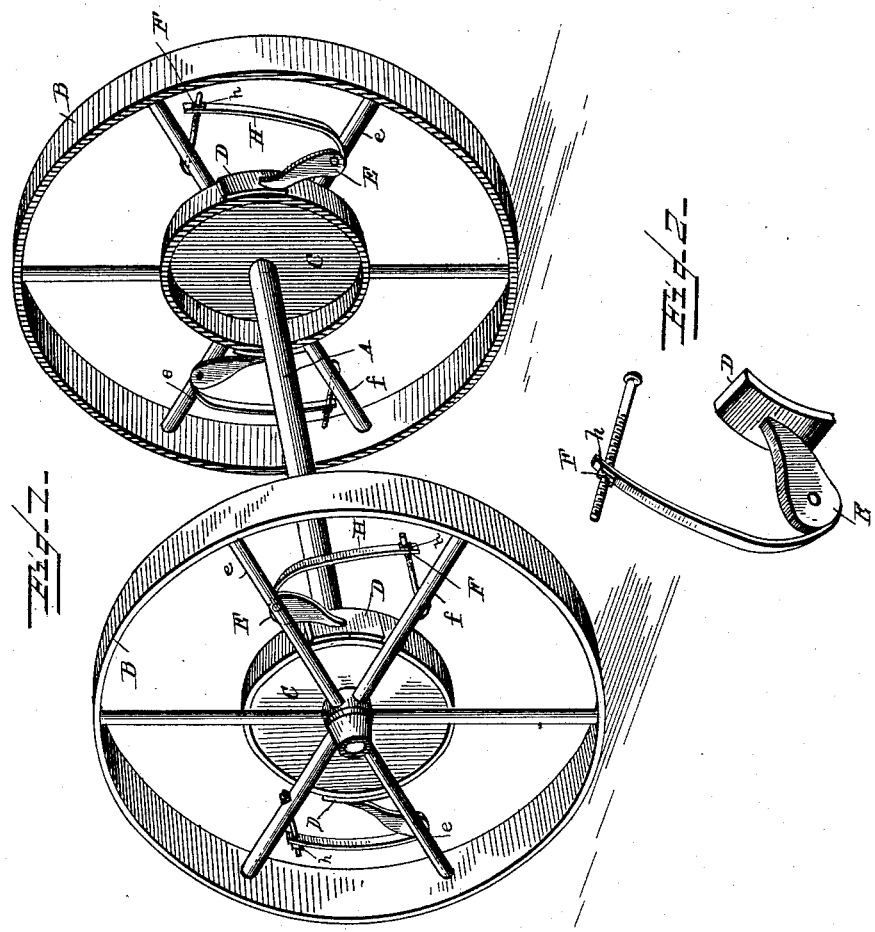

UNITED STATES PATENT OFFICE.

HANS G. JOHNSON, OF WAUKON, IOWA.

CORN-PLANTER.

SPECIFICATION forming part of Letters Patent No. 362,161, dated May 3, 1887.

Application filed September 27, 1886. Serial No. 214,638. (No model.)

*To all whom it may concern:*

Be it known that I, HANS G. JOHNSON, of Waukon, in the county of Allamakee and State of Iowa, have invented certain new and useful Improvements in Corn-Planting Machines; and I do hereby declare the following to be a full, clear, and exact description of the invention, such as will enable others skilled in the art to which it pertains to make and use the same.

My invention relates to improvements in devices for regulating corn-planting machines, the object being to provide a device of this character whereby the seed is discharged at equal intervals regardless of the condition of the ground and the fact that one of the drive-wheels may turn faster than the other.

The invention consists in combining, with the carrying-frame, axle, and suitable wheels mounted freely upon said axle, a device to cause the axle to revolve with the wheels.

The invention further consists in the details of construction and combination of parts fully described, and pointed out in the claims.

In the drawings, Figure 1 is a perspective view of my improvements, and Fig. 2 shows the friction-plate and attachments in detail.

A is an axle, upon which are freely mounted the carrying-frame and carrying-wheels B. The axle A imparts motion to the dropping mechanism, and may be connected thereto by any suitable means. At a point on the axle A, inward of the wheel B, is rigidly mounted a friction-wheel, C.

D is a friction-plate loosely attached to one end of a dog, E, whose other end is pivoted to one of the spokes of the wheel e. The inner side of the friction-plate D is curved to correspond to the periphery of the friction-wheel C, and over which it is placed. To the under side of the dog E is secured a curved spring, H, which is passed around the end of the dog, and thence upward. Through the upper end of the spring is passed a screw-threaded bolt, F, which is attached to the spoke f. The spring H is held in place on the bolt by a nut, h, which screws on the bolt.

The operation of my improvements is as follows: When the machine starts, the wheels B revolve, and the friction-plate D, which has been adjusted beforehand, bears against the friction-wheel C hard enough to turn it, thereby turning the axle A, from which motion is communicated to the dropping attachment.

It will be seen from the foregoing description that I regulate the amount of friction between the wheel and the plate, thereby causing the axle to revolve at speed of slowest wheel.

It will also be seen by the arrangement of the parts that should one of the wheels B in going over an elevation or in a depression obtain a greater speed than the other, it would not turn the axle at the increased speed, but the axle would be turned by the other wheel only, thus preventing the seed being dropped at unequal intervals.

Having fully described my invention, what I claim as new, and desire to secure by Letters Patent, is—

1. The combination, with the carrying-frame, axle, and carrying-wheels mounted freely upon said axle, of an adjustable device to cause the axle to revolve with said wheels, substantially as described.

2. The combination, in a machine for dropping corn, of an axle, carrying-wheels mounted freely upon said axle, a friction-wheel rigidly mounted upon the axle, and friction-plates arranged to bear upon said friction-wheel, substantially as described.

3. The combination, in a machine for dropping corn, of an axle having carrying-wheels freely mounted thereon and a friction-wheel rigidly mounted thereon, and adjustable friction-plates arranged to bear upon said friction-wheel, substantially as described.

4. The combination, in a machine for dropping corn, of an axle having carrying-wheels freely mounted thereon and a friction-wheel rigidly mounted thereon, and adjustable spring-actuated friction-plates arranged to bear upon said friction-wheel, substantially as described.

5. The combination, with the carrying-frame, axle, carrying-wheel, and friction-wheel, of a friction-plate, a dog pivoted at one end to said friction-plate and at the other end to a spoke of the carrying-wheel, and provided with a spring, which is secured to one of said spokes by means of a bolt and made adjustable thereto, substantially as described.

In testimony whereof I have signed this specification in the presence of two subscribing witnesses.

H. G. JOHNSON.

Witnesses:
F. J. BURNHAM,
WM. R. TILLOTSON.